UNITED STATES PATENT OFFICE.

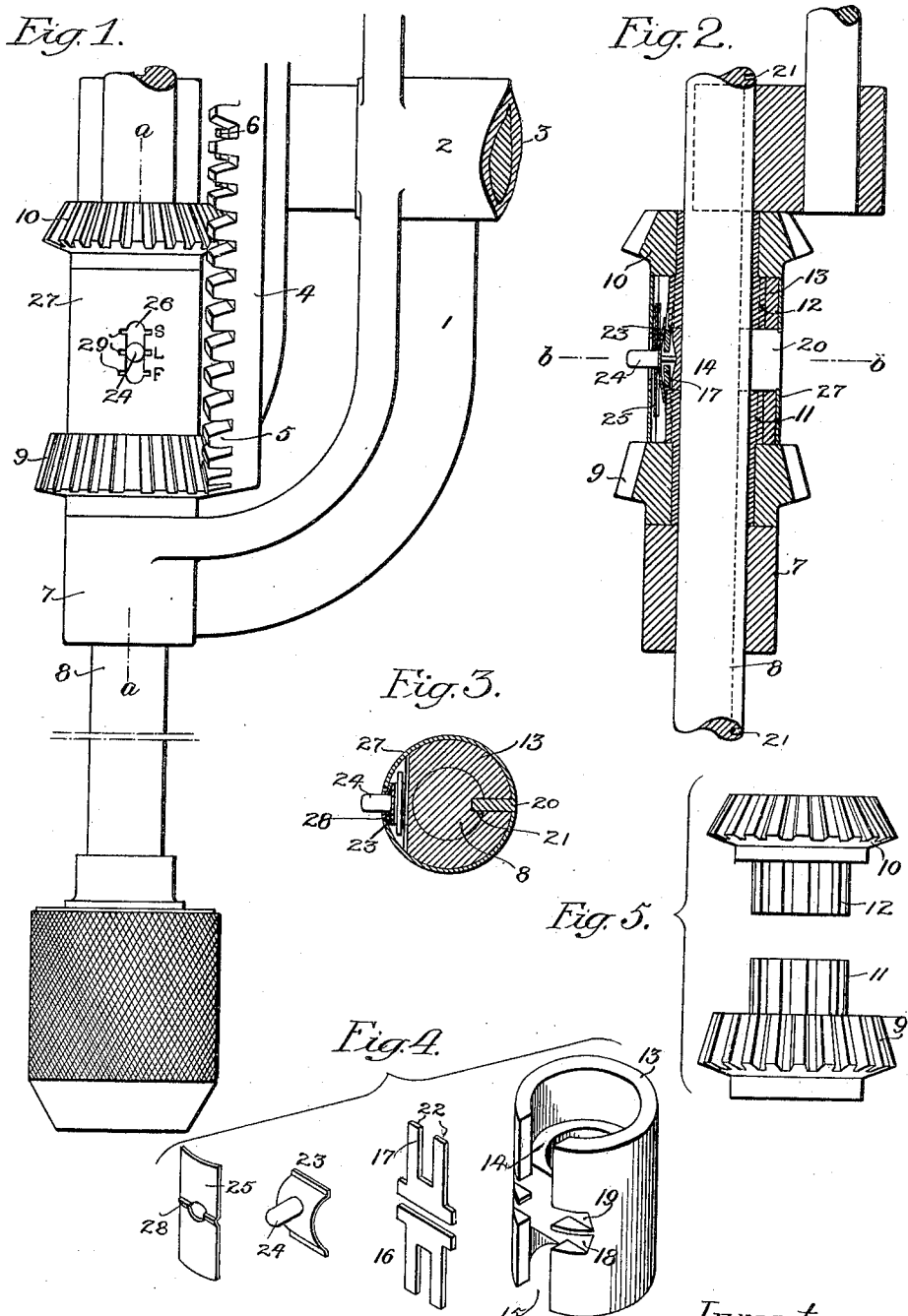

GEORGE O. LEOPOLD, OF PHILADELPHIA, PENNSYLVANIA, ASSIGNOR TO NORTH BRO'S. M'F'G. CO., OF PHILADELPHIA, PENNSYLVANIA, A CORPORATION OF PENNSYLVANIA.

CHANGE-SPEED MECHANISM.

1,103,784. Specification of Letters Patent. Patented July 14, 1914.

Application filed September 20, 1913. Serial No. 790,901.

*To all whom it may concern:*

Be it known that I, GEORGE O. LEOPOLD, a citizen of the United States, residing in Philadelphia, Pennsylvania, have invented certain Improvements in Change-Speed Mechanism, of which the following is a specification.

My invention relates to certain improvements in change speed mechanism for transmitting motion from the rotating wheels or hubs to a shaft or spindle.

The object of the invention is to construct the mechanism so that one or other of two hubs driven at different speeds can be connected to the shaft or both locked thereto so as to prevent rotation of the shaft.

The invention is particularly adapted for use in connection with a drill in which a chuck is mounted on the spindle and which will allow the shell of the chuck to be turned to open and close the jaws, while the spindle is held rigidly in the frame of the drill.

In the accompanying drawings: Figure 1 is a side view of a portion of a drill illustrating my invention; Fig. 2 is a sectional view on the line *a—a*, Fig. 1; Fig. 3 is a transverse sectional view on the line *b—b*, Fig. 2; Fig. 4 is a detached perspective view showing the shell, pawls, and shifter; and Fig. 5 is a detached view of the two beveled gear wheels.

Referring to the drawings, 1 is a portion of a frame of a drill having a bearing 2 for the driving shaft 3 on which is the gear wheel 4 having an outer set of teeth 5 at the periphery and an inner set of teeth 6 near the center. On the frame are bearings 7, one of which is shown, for the shaft or spindle 8 and loosely mounted on the spindle are two beveled gear wheels 9 and 10. The teeth of the gear wheel 9 mesh with the peripheral teeth 5 of the wheel 4, while the teeth of the beveled gear wheel 10 mesh with the inner teeth 6 of the wheel 4. The two wheels 9 and 10 are driven at different speeds. On the hub of the wheel 9 are ratchet teeth 11 and on the hub of the wheel 10 are ratchet teeth 12.

13 is a carrier made as clearly shown in Fig. 4 and having a central portion 14 through which extends the spindle 8. The carrier is slotted at 15 throughout its length for the reception of the pawls 16 and 17, and has transverse slots forming bearings 18 and 19 for the trunnions of the pawls 16 and 17 respectively. Extending through a slot in the carrier 13 is a key 20 which extends into a slot 21 in the spindle 8 so that while the spindle is free to move longitudinally through the casing and the gear wheels, it must turn therewith.

The pawls 16 and 17 are made, as clearly shown in Fig. 4, and each one has two fingers 22 which engage the ratchet teeth 11 and 12 of the gears 9 and 10. Back of the pawls is a shifter 23 which bears upon both pawls 16 and 17 and this shifter has a pin 24 which projects through an opening in the cover plate 25 and through a slot 26 in the casing 27 which extends over the casing and incloses the pawls and shifter. The cover plate has a transverse rib 28, which is arranged to enter any one of three notches 29 in the casing 27 so as to hold the shifter in any one of its three positions. When the pin 24 of the shifter is in the upper position marked "S", Fig. 1, then the pawls 17 are forced into engagement with the ratchet teeth 12 of the gear wheel 10, while the pawl 16 is moved out of contact with the teeth 11 of the gear wheel 9 and when the driving shaft 3 is turned, the spindle 8 will be driven at a slow speed. When the pin 24 is moved to the lowest position indicated at "F", Fig. 1, then the fingers of the pawl 16 are forced into engagement with the teeth 11 of the wheel 9 and the pawl 17 is moved out of engagement with the teeth 12 of the wheel 10. Consequently, the spindle will be driven at a high speed. When the pin 24 is in the central position opposite "L", Fig. 1, then the shifter 23 is in the mid position and both pawls are in engagement with the ratchet teeth of both gear wheels and as one gear wheel is driven at a greater speed than the other, the parts are locked. Therefore, while the parts are in this position the spindle or shaft is locked against rotation and the sleeve of the chuck can be turned to actuate the jaws to release or clamp a drill bit. This locking of the spindle is to prevent the rotation of the parts when the chuck is opened or closed and obviates the necessity of the operator holding the gears.

I claim:

1. The combination in change speed mechanism, of a spindle; a sleeve secured thereto; two wheels mounted loosely on the spindle; ratchet teeth on the wheels; a carrier;

two pawls pivotally mounted on the carrier, each pawl having two fingers; and means for shifting the pawls so that either one, or both of them, can be moved into engagement with their respective ratchet wheel.

2. The combination in change speed mechanism, of a spindle; a sleeve secured to the spindle; said sleeve being recessed; a carrier; a wheel loosely mounted on the spindle on each side of the carrier; said wheel having ratchet teeth; two pawls pivotally mounted on the carrier, one pawl engaging the ratchet teeth of one wheel and the other pawl engaging the ratchet teeth of the other wheel, each pawl having two fingers so as to positively lock its wheel to the carrier; a shifter for holding one or the other, or both, of the pawls in engagement with the wheels; and means for driving the wheels at different speeds.

In testimony whereof, I have signed my name to this specification, in the presence of two subscribing witnesses.

GEORGE O. LEOPOLD.

Witnesses:
RUSSELL O. GRAFFINS,
WM. A. BARR.

Copies of this patent may be obtained for five cents each, by addressing the "Commissioner of Patents, Washington, D. C."